Jan. 16, 1968   E. P. AGHNIDES   3,363,841
MOLDED WATER AERATORS
Original Filed Jan. 31, 1962

INVENTOR.
Elie P. Aghnides
BY Moore & Hall
ATTORNEYS

United States Patent Office 3,363,841
Patented Jan. 16, 1968

3,363,841
MOLDED WATER AERATORS
Elie P. Aghnides, 795 5th Ave., New York, N.Y. 10021
Original application Jan. 31, 1962, Ser. No. 170,140, now Patent No. 3,270,964, dated Sept. 6, 1966. Divided and this application June 16, 1966, Ser. No. 558,100
5 Claims. (Cl. 239—428.5)

ABSTRACT OF THE DISCLOSURE

The disclosure relates to water aerators of the type which are adapted for affixing to the discharge end of a water faucet to cause a bubbly, aerated stream of water to issue therefrom. More particularly, the aerators disclosed herein are of a type having an upstream diaphragm, downstream mixing screen, and axial air passageways for admitting air from the exterior of the aerator casing to an air-water mixing space located between the diaphragm and the mixing means.

---

This application is a division of U.S. Application Ser. No. 170,140, filed Jan. 31, 1962, now Patent No. 3,270,964, granted Sept. 6, 1966, for Molded Water Aerators. This invention relates to water aerators and, more particularly, pertains to water aerators which are so constructed and formed that they may be readily formed at low cost by well known methods of plastic molding.

With respect to the claimed subject matter of this application which relates to an aerator having a casing with a portion thereof surrounding the mixing means of the aerator, and with such portion defining an air passageway therethrough from the downstream end of the casing to the mixing space, this application Ser. No. 170,140 is a continuation-in-part of my prior copending application Ser. No. 601,712 filed Aug. 2, 1956, and issued Sept. 24, 1963 as Patent No. 3,104,828. Such patent application Ser. No. 601,712 is, in turn, a continuation-in-part of my prior copending application Ser. No. 560,299, filed Jan. 20, 1956, and issued Sept. 5, 1961 as Patent No. 2,998,927. The last-mentioned application is, in turn, a continuation-in-part of my prior copending application Ser. No. 351,907, filed Apr. 29, 1953 and abandoned on Jan. 25, 1961. Such application Ser. No. 351,907 is a continuation-in-part of my prior copending application Ser. No. 88,797, filed Apr. 21, 1949 and issued Dec. 29, 1953 as Patent No. 2,664,278.

In my prior copending application Ser. No. 163,972, filed Dec. 29, 1961, I have disclosed several embodiments of water aerators which are preferably formed of plastic and which are particularly constructed so as to be leakproof, obtaining this desirable characteristic without even requiring that sealing washers be used. In that prior application, there are set forth some of the advantages of fabricating aerators out of a plastic material which is relatively soft as compared to the appreciably harder metal from which the faucet is formed since this permits a close-fitting threading engagement between the threads on the aerator and the mating threads on the discharge end of the faucet to thereby effect a tight sealing between the two. The aerators of the present invention also embody these desirable characteristics, but are moreover constructed in such a way that they may be readily produced at low cost as by injection molding processes. More specifically, the various embodiments disclosed are so organized that the various water and air passageways are formed in a unitary structure while still permitting the aerators to be molded by a practical mold.

As is well known in the art, more efficient aerating action occurs when the various water and air passageways are at least in part formed laterally, i.e., along the aerator axis, so that the paths provided for water flow are substantially at right angles to the normal direction of flow of the water throughout aerator casing. Such lateral passageways provide for a more effective breaking up of the water into turbulent streamlets and also aid in the mixing of the streamlets with air so that a more bubbly stream will issue. Ordinarily, it would be expected that such lateral passageways could not readily be formed by a molding process making use of a practical mold, whereby the entire aerator casing is formed in a single molding step, being completed when the two parts of the mold are separated in the direction of the aerator axis. However, as will appear herein, the present invention makes it possible to use such a convenient and low-cost molding process while still obtaining the highly desirable lateral passageways.

In describing the invention in detail, reference will be made to the accompanying drawings in which.

Figure 2:
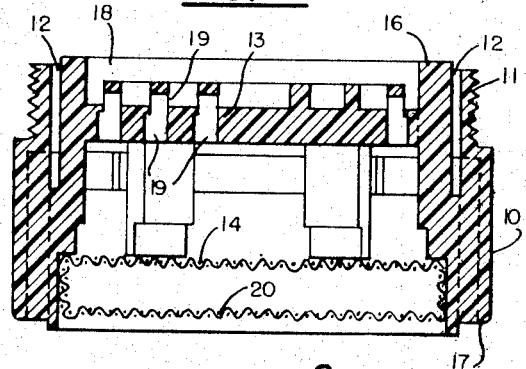
FIGURE 2 is a cross-sectional side view of the aerator of FIGURE 1 taken along the lines 2—2.
Figures 3, 3A:
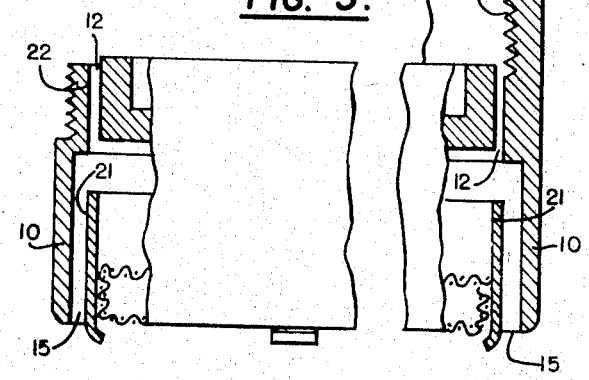
FIGURE 3 is a fragmentary cross-sectional side view of the aerator of FIGURE 2 taken along the line 3—3 of FIGURE 1; this device having male threads on its outside for attachment to a faucet which is threaded on its inside.
FIGURE 3A is another fragmentary cross-sectional side view of a modified form of the device which is identical with FIGURE 3 in all respects except that it has female threads to mate with male threads on the outside of a faucet.
Figure 7:
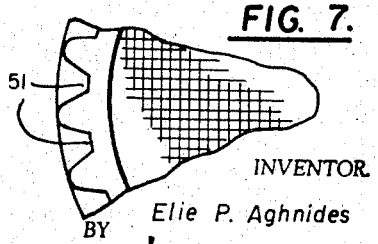
FIGURE 7 is a bottom view of the embodiment of my invention shown in FIGURE 6.

In FIGURES 2 and 3, the annular side wall of the aerator casing 10 is shown as having threads 11 formed externally on its upstream end to thereby permit the threading engagement of the casing 10 with the similarly threaded end of a faucet (not shown). Of course, internal threads could as well be provided to adapt the casing for attachment to a faucet which is externally threaded, as partially shown in FIGURE 3A.

The diaphragm 13 is molded integrally with the side wall of the casing and is generally of the type disclosed in my Patent No. 2,998,929 issued Sept. 5, 1961. The side wall of the casing 10 is shown as having formed therein an annular shell passageway 12 which extends from the upstream end of the casing toward the downstream end. This annular passageway 12 is shown in FIGURES 2 and 3 as being concentric with the cylindrical side wall of casing 10 and extending axially downstream so as to terminate below the diaphragm 13. Also, this shell passageway 12 is shown as communicating at its downstream end with the hollow interior of the casing. When the proper mold is used in forming the unitary casing, this annular shell passageway is formed by a protruding annular cylindrical member on the die which also forms the upper portion of the aerator casing including, moreover, the upper surface of diaphragm 13.

Figure 1:
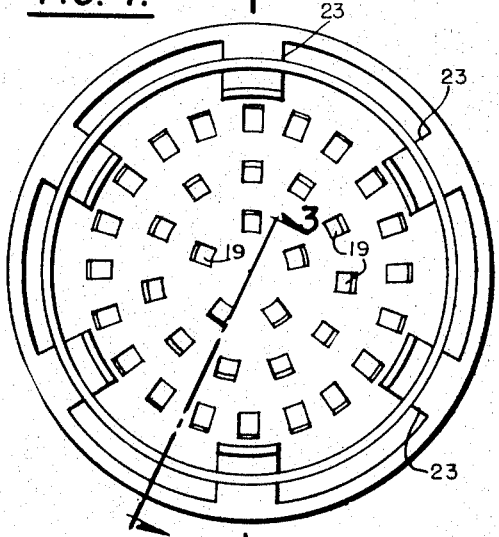
FIGURE 1 is a bottom view of one embodiment of the invention.

Another annular shell passageway 15 is formed in the side wall of casing 10 and extends from the discharge end of the aerator casing in an upstream direction toward the entrance end as shown in the cross-sectional view of FIGURE 3. FIGURES 2 and 3 both demonstrate that the inner wall 21 of the outer shell passageway 15 is coincident with the outer wall 22 of the inner shell passageway 12. Moreover, the two annular shell passageways substantially overlap for a common portion of their axial lengths as can be seen in FIGURE 1. In the molding process, this passageway is formed by a protruding annular cylindrical member on the die member which forms, among other parts, the casing interior downstream of the diaphragm as well as the concentric rings of apertures 19 in diaphragm 13 (see FIGURE 1). Actually, the cylindrical proturberance on the upper die forming the passageway 12 makes substantially a force fit within the cylindrical proturberance on the lower die forming the shell passageway 15. The fit between these two opposing die portions is so close that none of the plastic material of which the casing is formed can be forced therebetween. As a result, where these opposing die members come into such close contact, apertures are formed whose lateral dimensions are parallel to the axis of the aerator. Thus, air paths are formed whereby air drawn into the lower shell passageway 15 will pass upwardly and into the interior of the casing between the diaphragm 13 and the upper mixing screen 14 since the inner passageway 12 communicates directly with the interior of the casing 10. It is, of course, impossible to permit both annular shell passageways 12 and 15 to be continuous around their entire circumference, since, if this were permitted, the casing could no longer be a unitary structure. This is overcome by joining the opposing sidewalls of at least one of the annular shell passageways at a plurality of places about its circumference. This is clearly shown in FIGURE 1 which indicates that the side walls of the passageway are joined by integral bridging members of which a plurality are shown at 23 in FIGURE 1. It will be appreciated that these bridging members 23 are formed by merely providing a plurality of axial slots in the cylindrical protrusion on the lower die portion forming the annular shell passageway 15.

FIGURE 2 shows the mixing means as comprising an upper screen 14 together with the lower mixing screen 20. The lower screen 20 is circular in shape, whereas the upper screen 14 is of inverted cup-shaped form. Since the aerator casing is preferably formed of a plastic material, the screens 14 and 20 may readily be force fitted into place within the discharge end of the casing, thereby being frictionally held by the interior side wall of the casing. In the bottom view of FIGURE 1, the screens have been removed in order that the structure of the aerator casing 10 might be more readily displayed.

Figure 4:
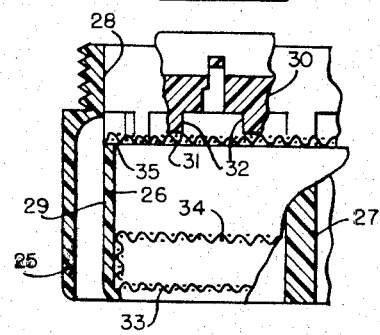
FIGURE 4 is a cross-sectional side view of an alternative embodiment of the invention.

In FIGURE 4, the unitary casing for the aerator comprises an outer cylindrical shell 25 and an inner cylindrical shell 26 which is spaced from the outer shell 25 a suitable distance so as to provide air passageways therebetween. A portion of the inner shell 26 is shown as being cut away, thereby illustrating one of several ribs 27 which are integral with both the inner and outer shells 25 and 26 and join the two at a plurality of locations around their circumference.

The inner cylindrical surface 28 of the casing at its upstream end has a slightly larger diameter than does the inner cylindrical surface 26 which extends axially substantially to the discharge end of the casing. As a result, an annular ledge 35 is formed upon which the diaphragm 30 rests. The annular shell passageway existing between the inner and outer walls 25 and 26 has an inner diameter which substantially equals the diameter of the inner cylindrical surface 28. Since the annular shell passageway extends upstream above ledge 35, a plurality of apertures are formed whose lateral dimensions are parallel to the axis of the aerator. The surfaces 28 and 26 are formed by one of the two die members, while the annular shell passageway is formed by the opposing, mating die member. The opposing die portions forming respectively the surface 28 and 29 fit tightly over their overlapping portions, thereby forming a plurality of lateral air passageways, i.e., areas in which none of the plastic material forming the aerator casing can appear so that lateral passageways are formed which cause the annular shell passageway between walls 25 and 26 to communicate with the casing interior. As already indicated, the axial ribs 27 are integral with and join the walls 25 and 26 at circumferentially spaced locations.

The diaphragm 30 in FIGURE 4 differs from that in FIGURE 2 in that it is not integral with the aerator casing but is, instead, separately molded. The diaphragm 30 may rest on top of the upper mixing screen 31 which, in turn, rests upon annular ledge 35. The diaphragm 30 is formed with a plurality of spaced depending feet 32 which actually make contact with the upper screen 31. The air which is drawn upwardly through the space between walls 25 and 26 is admitted into the apertures defined by the successive spaced feet of the diaphragm 30 and is then admixed with the turbulent streams of water existing below the level of the diaphragm.

Lower mixing screens 33 and 34 are also shown, and these are similar to the corresponding screens 14 and 20 of FIGURE 2. If the upper screen 31 is used, it is then ordinarily not necessary to use also the middle screen 34. It is also feasible, however, to use the screens 33 and 34 and then not use the screen 31 in which case the diaphragm 30 will rest directly on the annular ledge 35.

Figure 5:
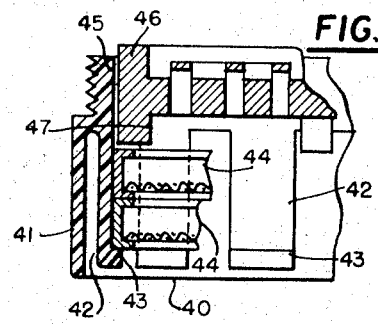
FIGURE 5 is a cross-sectional view of another alternative embodiment.

In the embodiment of FIGURE 5, the casing 40 has an outer annular wall or skirt 41 which may be continuous around its circumference, and the casing then also includes the depending ribs 42, each of which is spaced from the outer wall or skirt 41 to form an annular shell passageway therebetween. The bottom-most portion of each of the depending ribs 42 has an inwardly-bent edge which forms a ledge 43 upon which may be placed the several mixing screens 44. It should be noted that the inner surface of each of the depending ribs 42 is actually a linear extension of the cylindrical inner wall 45 at the top of the casing. This means that the die which forms the upper portion of the casing may be so constructed as to simultaneously form the inner surface of each of the depending ribs 42 and may also form the top edge of each of the protruding ledges 43. On the other hand, the remaining die portion will then include an upwardly-extending circular shell member which will define the annular cavity between the inner and outer walls 42 and 41, respectively, of the casing.

In the assembly of the aerator, the screens are put in place, with the bottom-most one resting upon the several ledges 43, and the removable diaphragm 46 then rests upon the uppermost screen. The diaphragm 46 may have depending feet 47 which contact the upper screen to thereby permit the plurality of jet-forming apertures in the diaphragm to be suitably spaced from the top-most mixing screen.

The air inlet means for the aerator of FIGURE 5 comprises the annular shell passageway existing between the inner and outer casing side walls 41 and 42. Air is drawn upwardly through this shell passageway and is free to enter the space between the diaphragm and the uppermost mixing screen by passing through the several apertures which exist between the successive depending ribs 42.

Figure 6:
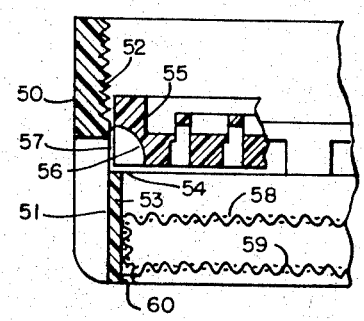
FIGURE 6 is a cross-sectional side view of a still different embodiment of this invention.

In FIGURE 6 there is illustrated a still different embodiment of my invention in which no outer annular skirt member is provided comparable to the outer wall 41 of FIGURE 5. This embodiment of FIGURE 6 has the advantage that it can be manufactured at very low cost. The casing 50 is of unitary construction and is also preferably formed of a plastic material, similar to the other embodiments already described. At a plurality of places around the circumference of the lower portion of the casing, indentations 51 are provided, and the depth of each of these indentations is such that its bottom-most portion is substantially coincident with the cylindrical surface defined by the interior side wall of the casing at the region 52 where it has the maximum diameter. The interior of the casing 50 is of somewhat reduced diameter at its lower portion 53. Each of the indentations 51 extend sufficiently far upstream from the discharge end, along the outer wall of the casing, so as to overlap at least a portion of the axial length of the casing having the larger diameter as at 52. Because of this, each of the indentations 51 communicates at its upper end with the interior of the casing. Where the indentations 51 do not occur, material remains which is integral with and joins the upper and lower casing portions.

An annular ledge 54 is formed at that point on the inner side wall of the casing where its diameter is reduced, and the diaphragm 55 rests upon this ledge. The diaphragm 55 has its lower and outer edge cut away as at 56 to thereby provide a passageway whereby air admitted through the lateral passageways 57 may pass into the interior of the casing in the region below the diaphragm 55 and above the uppermost mixing screen 58. The apertures in the diaphragm are spaced sufficiently above the uppermost screen 58 as a result of the rather considerable height of the concentric rings 61 provided on the bottom of diaphragm 55. The screens 58 and 59 are generally similar to those previously described, the lower screen 59 resting upon an annular ledge which is formed by turning inwardly the bottom edge of the inner wall 51 of the casing.

It will be appreciated that the form of the invention illustrated in FIGURE 6 may also be readily molded by a simple, two-piece mold. The upper mold will define the dimensions of the inner wall 52, the ledge 54 and the inner wall 53 of reduced diameter as well as the top surface of ledge 60 upon which the lower screen 59 rests. The lower die will include a plurality of inwardly-extending ribs which will form the indentations 51, and the most inwardly-extending portions of the ribs on the die will make substantially a force fit with that portion of the upper die which forms the side wall 52. Because of this close fit, none of the plastic material of which the aerator is formed can fit into any space where these two die members come in contact, and the result of this is to form the plurality of lateral apertures 57 whereby air may be admitted into the interior of the aerator.

Having described an improved aerator which is particularly formed so as to permit it to be readily molded from plastic materials and having disclosed several modifications of my invention, I wish it to be understood that various modifications, adaptations and alterations may be made to the specific form shown without in any manner departing from the spirit or scope of my invention.

What I claim is:

1. A water aerator comprising, a generally circular annular casing member supporting a foraminous diaphragm near its upstream end and at least one perforate mixing screen near its discharge end, said casing having a first inner diameter extending from its upstream end axially to at least the location of said diaphragm and thereafter having a reduced second diameter downstream of said diaphragm, the outer side wall of said casing defining therein an annular shell passageway concentric with the interior walls of said casing and parallel to the axis of said casing and communicating with the atmosphere, said first diameter of said casing being at least equal to the inner diameter of said annular passageway, said passageway extending axially toward the upstream end of said casing beyond the location of reduction in interior diameter of said casing, means connecting the opposing side walls of said passageway at a plurality of locations about the circumference of said passageway whereby said annular shell passageway communicates at its upstream end with the interior of said casing to thereby form a plurality of air passageways to conduct air from the discharge end of said aerator to the interior of said aerator between said diaphragm and said mixing screen.

2. The aerator of claim 1 in which said interior side wall of said casing having said reduced second diameter is imperforate.

3. The aerator of claim 1 wherein an annular ledge is formed by said change in inner diameters of said casing and said diaphragm has circumferentially-spaced depending feet which rest upon said ledge and said air admitted through said passageway and into the interior of said casing passes through the apertures in said diaphragm defined between successive of said depending feet.

4. A water aerator comprising in combination, a molded annular plastic casing threaded at one end for engagement with the threaded end of a faucet, said casing supporting a diaphragm transverse to the axis of said casing near the inlet end of said casing, at least one mixing screen supported by said casing near the discharge end of said casing, said casing having a first inner diameter extending axially from the inlet end to at least a position downstream of said diaphragm and thereafter having a reduced diameter to the discharge end of said casing, the side wall of said casing defining therein an annular shell passageway concentric with the axis of said casing and having an inner diameter substantially equalling said first diameter of said casing, said annular shell passageway extending from the discharge end of said casing axially upstream to partially overlap that portion of the axial length having the first inner diameter, and means joining the opposing side walls of said passageway at spaced locations about its annular length, whereby a plurality of air passageways are formed to conduct air through said annular shell passageway in a direction opposite to that of the direction of water flow to the interior of said casing between said diaphragm and said mixing means.

5. The aerator defined in claim 4 in which said means comprises a plurality of ribs which are integral with said opposing side walls and have side surfaces extending parallel to the axis of said aerator.

No References Cited.

EVERETT W. KIRBY, *Primary Examiner.*